Aug. 8, 1967                    E. S. ERWIN                    3,334,575
                        BATCH COOKER PRESSURE VESSEL
Filed Dec. 27, 1965                                          2 Sheets-Sheet 1
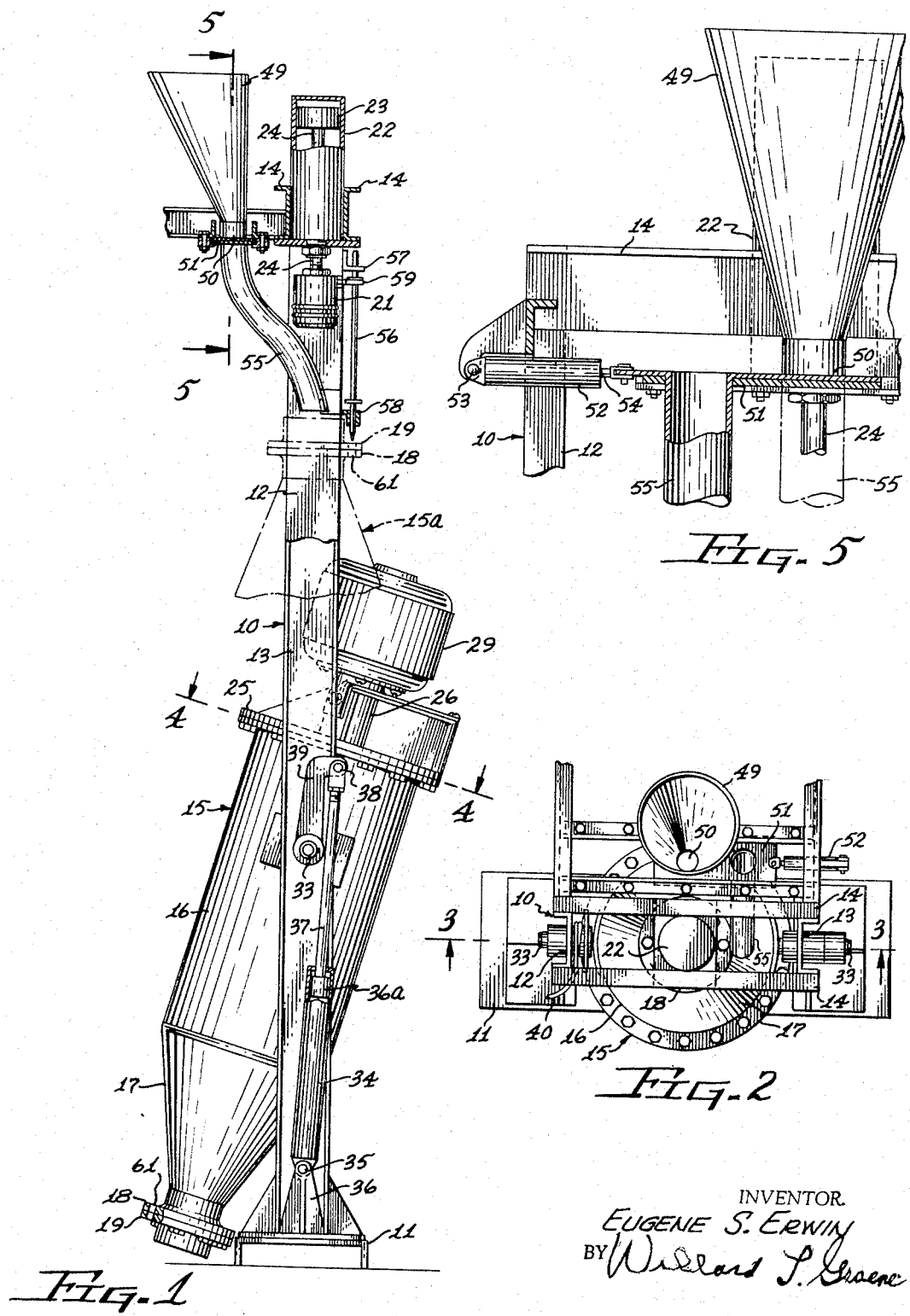
INVENTOR.
EUGENE S. ERWIN
BY Willard S. Greene
ATTORNEY

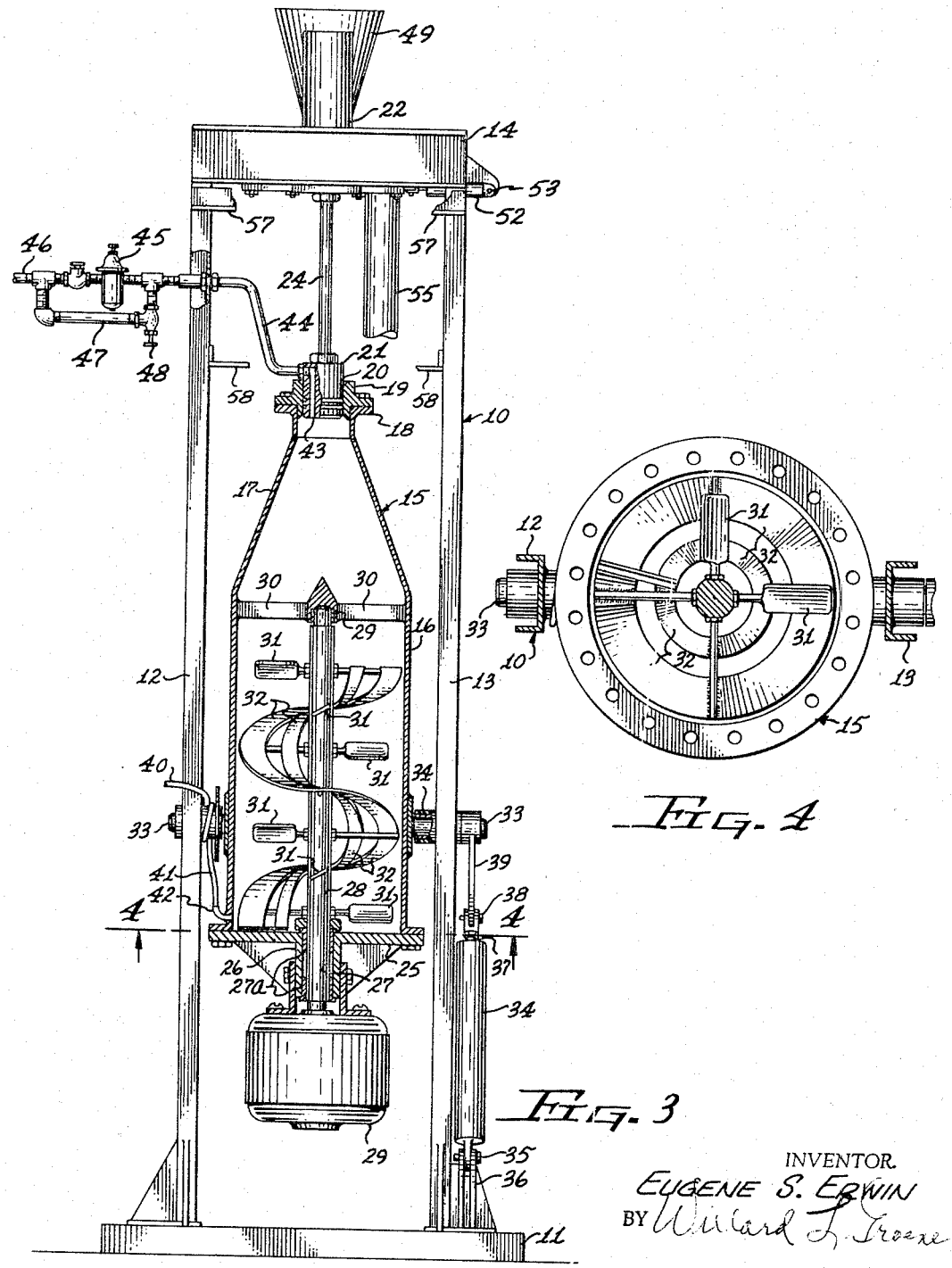

United States Patent Office 3,334,575
Patented Aug. 8, 1967

3,334,575
BATCH COOKER PRESSURE VESSEL
Eugene S. Erwin, 6856 N. 12th Way,
Phoenix, Ariz. 85014
Filed Dec. 27, 1965, Ser. No. 517,523
4 Claims. (Cl. 99—348)

This invention pertains to a batch cooker pressure vessel and apparatus for charging and unloading such vessels.

One of the objects of this invention is to provide a vessel which is provided with a stirring and mixing mechanism and which is tiltable for loading and unloading the contents in the vessel.

Another object of this invention is to provide a batch cooker pressure vessel of simplified and durable construction.

Still another object is to provide in a vessel as above described apparatus for cooking and treating the contents of the vessel at high temperatures while at the same time mixing and stirring the contents under heat and pressure treatment.

Further features and advantages of this invention will appear from a detailed description of the drawings in which:

FIG. 1 is a side elevation of the batch cooker pressure vessel shown in discharging position.

FIG. 2 is a plan view of the apparatus shown in FIG. 1.

FIG. 3 is an enlarged sectional view on the line 3—3 of FIG. 2.

FIG. 4 is an enlarged sectional view on the line 4—4 of FIGS. 1 and 3.

FIG. 5 is an enlarged sectional view on the line 5—5 of FIG. 1.

As an example of one embodiment of this invention, there is shown a batch cooker pressure vessel apparatus comprising a main frame 10 having a base 11 to which are fixed the upstanding columns 12 and 13 which in turn are fixed together at their upper ends by the tie bars 14.

The cooking and pressure vessel 15 comprises an intermediate cylindrical portion 16 to the top end of which is fixed the conical reducing portion 17 terminating at its upper end with an integral inlet flange 18 to which is fixed the closure sleeve 19 having a loading and discharge bore 20 in which the closure piston 21 may be inserted and withdrawn by a fluid pressure holding cylinder 22. The cylinder 22 is rigidly mounted on the tie bars 14 and has the usual piston 23 and piston rod 24 fixed to the closure piston 21.

The lower end of the cylindrical portion 16 of the vessel 15 is closed by a head plate 25 and has centrally located therein a bearing boss 26 having a bore 27 in which are carried suitable bearings 27a adapted to rotatably support the impelled shaft 28 extending upwardly within the vessel 15. A suitable drive motor 29 is mounted rigidly on the head plate 25 and has its armature fixed in driving relationship to the impeller shaft 28.

The upper end of the impeller shaft 28 is journaled in a suitable bearing 29 supported by suitable braces 30 within the upper end of the cylindrical portion 16 of the vessel 15. Suitable agitating paddles 31 and mixing helical members 32 are fixed to the impeller shaft 28 for stirring the contents in the vessel 15.

The vessel 15 is mounted on a pair of spaced trunnions 33 journaled to rock in suitable bearings 34 carried in the columns 12 and 13 when actuated by the fluid pressure cylinder 34 pivotally mounted on a suitable pin 35 carried in the bracket 36 fixed to the base 11. The piston 36a and the piston rod 37 connected thereto is pivotally connected to the pin 38 in the outer end of the lever arm 39 fixed to one of the trunnions 33 of the vessel 15 so that the cylinder 34, when appropriately energized, may rock the vessel 15 from the dumping or discharge position shown in FIG. 1 to the loading and cooking position shown in FIG. 3.

Live steam is delivered to the supply pipe 40 through a suitable flexible wray-around flexible hose 41 connected to the steam inlet fitting 42 into the interior of the vessel 15. Steam discharges from the vessel 15 through the passageway 43 in the closure piston 21 and then out through the flexible line 44 and the pressure regulating valve 45 to the outlet line 46, a bypass line 47 and valve 48 being utilized to rapidly evacuate the steam pressure in the vessel after the processing cycle has been completed.

The apparatus is provided with a supply hopper 49 for the material to be treated mounted on the tie bars 14 and having a discharge outlet 50 at its lower end controlled by a suitable sliding gate valve 51 actuated by a fluid pressure cylinder 52 connected at 53 to the frame of the device, and having its piston rod 54 suitably connected to the gate valve 51 as best shown in FIG. 5, so that by suitably energizing the cylinder 52 the discharge from the hopper 49 may be closed off or connected to a discharge spout 55 which at the same time is brought in alignment with closure sleeve bore 20 for discharge of the material to be treated when the vessel 15 is in loading position 15a shown in broken line position in FIG. 1. At this time the closure piston 21 is in upper retracted position and the safety lock rod 56 carried in guide members 57 and 58 on the frame 10 is retracted upwardly by the eyebolt 59 fixed to the piston 21 to hold it withdrawn from the positioning lug 60 fixed on the vessel 15. As soon as the vessel is loaded from the spout 55 the cylinder retracts the spout and closes off the hopper 49. The closure piston 21 is then moved downward into the closure bore 20 to tightly seal off the opening while at the same time the safety lock rod enters the bore 61 of the lug to prevent movement of the vessel when piston 21 is in the closure bore and to stabilize the vessel during the operation of the main drive motor 29 in stirring the contents in the vessel while the cooking operation is going on. At the conclusion o fthe operating cycle, the piston is withdrawn after the steam pressure has been discharged from the vessel and the vessel rocked to dumping position as shown in FIG. 1.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and described to be obtained by United States Letters patent is:

1. A batch cooker pressure vessel comprising in combination:
 (A) a frame,
 (B) an elongated cooking and pressure vessel pivotally mounted on said frame to rock about a horizontal axis thereon,
 (C) a loading and discharge opening on one end of said vessel,
 (D) a closure piston arranged to be inserted into and removed from said loading and discharge opening when the end of said vessel containing said opening is swung to upper position,
 (E) means interconnected between said frame and said vessel for swinging said vessel about said horizontal axis to and from said upper position and a downwardly swung discharge position of said vessel,
 (F) and means for injecting steam into said vessel while exhausting steam from said vessel through said closure piston.

2. In a batch cooker as set forth in claim 1, means on said frame connected to said closure piston to insert and withdraw said piston relative to said loading and discharge opening.

3. A batch cooker as set forth in claim 1 including:
   (G) a material supply hopper on said frame,
   (H) and means for connecting discharge from said hopper to said loading and discharge opening when said closure piston is retracted from said loading and discharge opening.

4. In a batch cooker as set forth in claim 1, a motor driven stirring device within said vessel energizable during the cooking and discharge cycle of said batch cooker.

References Cited

UNITED STATES PATENTS

| 440,752 | 11/1890 | Barotte | 202—185 |
| 1,083,802 | 1/1914 | Castona | 202—170 |
| 1,339,323 | 5/1920 | Dakin | 99—348 |
| 1,607,345 | 11/1926 | Harding et al. | 99—348 |
| 2,513,254 | 6/1950 | Savage et al. | 259—107 |

FOREIGN PATENTS

| 1,042,109 | 6/1953 | France. |
| 55,139 | 1/1891 | Germany. |

BILLY J. WILHITE, *Primary Examiner.*